Feb. 22, 1955 D. W. HARLING 2,702,850
GLOBE FOR LUMINAIRES
Filed Feb. 10, 1950 2 Sheets-Sheet 1
FIG. I.
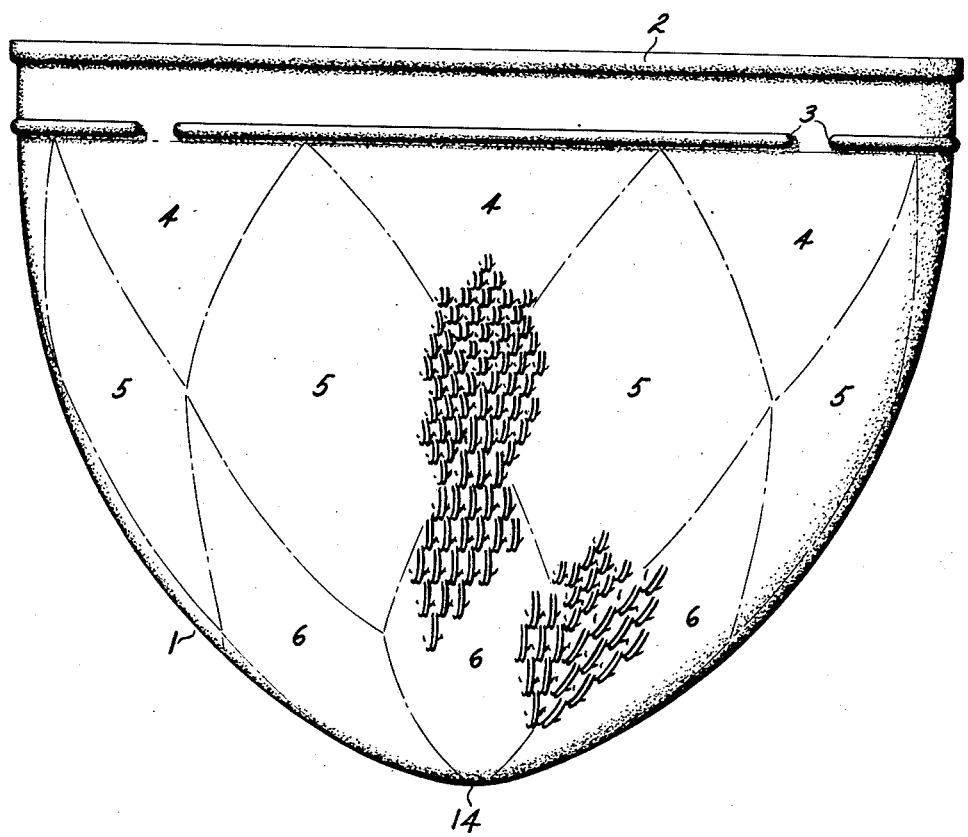
FIG. 5.
DONALD W. HARLING
INVENTOR.
BY *Charles A. Crandell*
ATTORNEY Feb. 22, 1955  D. W. HARLING  2,702,850
GLOBE FOR LUMINAIRES
Filed Feb. 10, 1950  2 Sheets-Sheet 2
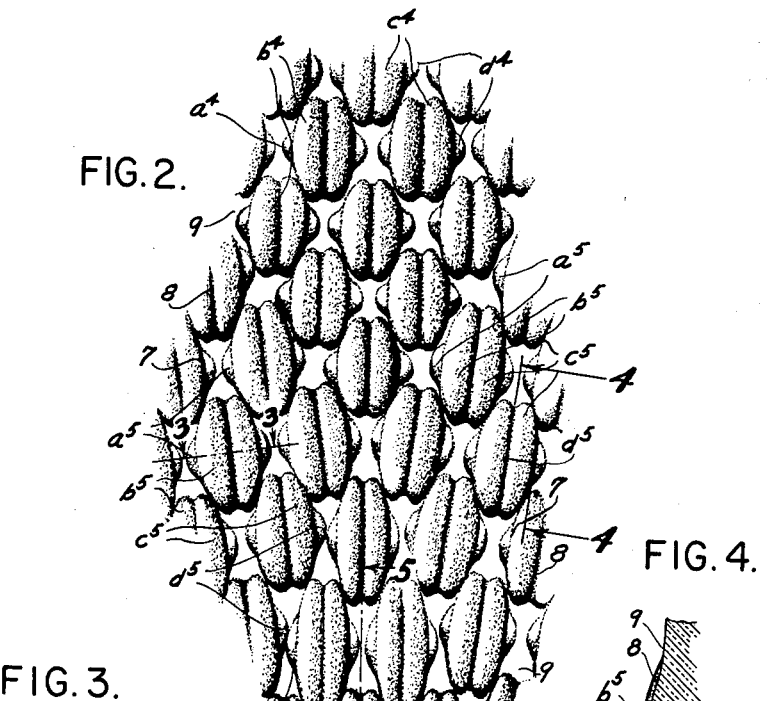
DONALD W. HARLING
INVENTOR
BY
ATTORNEY

United States Patent Office 2,702,850
Patented Feb. 22, 1955

2,702,850

GLOBE FOR LUMINAIRES

Donald W. Harling, Milwaukee, Wis., assignor to McGraw Electric Company, Milwaukee, Wis., a corporation of Delaware Application February 10, 1950, Serial No. 143,395

2 Claims. (Cl. 240—106)

This invention relates to lighting units, and is more particularly directed toward the bowls or globes surrounding the light source.

Lighting units have long been provided with bowls or globes which embody configurations having facets on the surfaces for refracting light rays to desired locations. One great disadvantage in using these configurations has been the irritating effect of resulting glare on approaching motorists and pedestrians where such globes are used in street lighting luminaires. Glare is an uncomfortable brightness caused by a contrast in the degree of illumination of adjacent areas. This contrast may be a result of viewing a lighted luminaire in the black night background, or of viewing a luminaire having an uneven distribution of light rays refracted from configuration facets. As far as the luminaire surface is concerned, this uneven distribution of transmitted light from the facets gives the appearance of a luminous globe with glare producing bright spots. Road surfaces also enhance the disagreeable glare effect when they are bright or wet, producing a reflection of the offending glare to the eyes of approaching motorists and pedestrians.

Another disadvantage of most existing street lighting luminaires is that the glare from external refracting configurations has proved disturbing to houseowners. Various means have been offered to reduce this unpleasant effect, such as painting the house-side of the globe, or placing some opaque material between the light source and the globe surface. These have provided disadvantageous because of the shadows that are cast, which in turn reduce lighting efficiency on the sidewalk side of the street.

Heretofore, diffused glare free light transmission has been produced by the interference of particles beneath the transmitting surface, or by roughening the surface. Sand blastting, etching, entrapment of air bubbles, scratching of irregular lines, and adding translucent or opaque substances have long been used for this purpose. These methods have many disadvantages. The foremost disadvantage is the resulting loss in lighting efficiency from light absorption. Because of this, in some cases the luminaires, as with opal glass, serve little more than ornamental purposes. Another major disadvantage is the difficulty of directing or controlling the transmitted rays to desired locations.

The present invention contemplates a lighting unit globe with configurations ovate in contour that are symmetrically arranged on the globe surface in a manner as to afford a maximum of contoured surfaces. The present invention overcomes the disadvantages of previous luminaire globes by the use of properly designed configurations. The contoured configurations eliminate any flat surfaces or facets, and are so spaced on the globe that there are no globe surfaces which are not a part of the configurations. To the eye, at a distance, the entire globe appears luminous producing the effect of greater illumination on the lighted area without causing the eye to "squint" on approach to the lighted area. Within the lighted area the glare effect from approaching headlights of automobiles is considerably lessened because of increased diffusion of the luminaires employing globes with the novel configuration. The effect of viewing a pin point lighting source in a massive black background will be greatly reduced. Flat surfaces, either as configuration facets or as a part of the globe surface, are eliminated, thus creating a maximum amount of diffused light ray transmission rather than the unpleasant glare effect produced by uneven transmission. The use of a transparent light transmitting medium in the present invention, permits a maximum amount of illumination that may be very easily controlled or concentrated, thus permitting the novel surface configurations to provide a luminaire with minimum glare. The configurations are so designed that they may be used in luminaires that employ reflecting means for directing light to desired locations, or in conjunction with light directing prismatic configurations on the opposite globe surface. Thus concentrated, but evenly diffused, light will be transmitted from the globe, giving a soft and pleasing appearance without loss in efficiency.

It is therefore a primary object of this invention to provide a bowl or globe for lighting installations that will afford a maximum amount of diffused light, eliminating unpleasant glare effect without noticeable loss in efficiency.

Another object of this invention is to provide a lighting unit globe with symmetrical configurations which is relatively inexpensive to manufacture, employing machine cutting of the mold, rather than hand chipping.

The following description will disclose a lighting unit globe with a surface configuration that will provide maximum glare-free illumination, and which is relatively inexpensive to manufacture.

In the drawings:

Fig. 1 illustrates a globe used in a street lighting luminaire employing the invented configuration and the preferred geometric arrangement embodying the configurations.

Fig. 2 is an enlarged elevational fragmentary view of a portion of the globe surface illustrating the novel configurations and preferred geometric arrangement.

Fig. 3 is a sectional view on the line 3—3 of Fig. 2.
Fig. 4 is a sectional view on the line 4—4 of Fig. 2.
Fig. 5 is a sectional view on the line 5—5 of Fig. 2.
Fig. 6 is a diagram illustrating the direction of light rays transmitted by a refracting prismatic surface.

Fig. 7 is a diagram illustrating the diffused light ray transmission provided by the novel configurations.

Referring more in detail to the accompanying drawings, the globe 1 of Fig. 1 is of a light transmitting material, and is provided with a means for retaining it in a luminaire assembly, such means in the present invention comprising a bead 2 and guide ribs 3 spaced therefrom.

The geometric areas generally indicated on the globe surface by reference characters 4, 5 and 6, are provided for a purpose hereinafter described. It is to be noted, for the present, that the areas bearing the same reference character are substantially identical. These areas are indicated on Fig. 1 by dash-dot lines. The dash-dot lines do not appear on the actual globe surface, but are merely boundaries of the areas 4, 5 and 6 which make up geometric patterns of configuration groupings more clearly indicated in Fig. 2.

The areas 4, 5 and 6 are respectively arranged in groups of configurations as are shown in Fig. 2, each group in area 4 comprising configurations $a^4$, $b^4$, $c^4$, and $d^4$; in area 5 comprising configurations $a^5$, $b^5$, $c^5$, and $d^5$; and in area 6 comprising configurations $a^6$, $b^6$, $c^6$, and $d^6$. Each group in a given area is substantially the same as like groups in that area and substantially the same as like groups as of other like areas. The groups in each of the like areas are similar to those in other like areas differing only in dimensional proportions. The groups in areas 5 are representative of those in areas 4 and 6, and therefore a description of configurations $a^5$, $b^5$, $c^5$, and $d^5$ will serve equally well as a disclosure of the contours of the configurations in areas 4 and 6. Referring to Figs. 2, 3, 4, and 5, the contoured surfaces of configurations $a^5$ and $d^5$ are substantially identical, except that they are arranged in left-hand and right-hand relationship. This is also apparent as to the lenticular-like configurations $b^5$ and $c^5$. The configurations $a^5$ and $b^5$ are separated by and merge into the arcuate depression 7 clearly disclosed by Figs. 3 and 4. The configurations are grouped so that the contoured surfaces thereof and between them primarily serve to refract the transmitted light into convergent and divergent rays, thus diffusing the light and minimizing the glare effect.

Effectively diffused light may be obtained by employing configurations similar to $a^5$ and $b^5$ and a larger central configuration comprising a contoured surface (not shown) embracing the area including lenticular-like configurations $b^5$ and $c^5$ and the portion 8 which is depressed relative to the configurations and arcuate relative to the globe contour.

It is known that the configuration arc controlling diffusion of transmitted light rays is dependent on the radii of the curved surface, and/or the depth that the configurations are molded on or into the globe surface.

The problem arises in providing configurations which are aesthetically proportional to the globe surface, and which at the same time provide the desirable degree of light diffusion. To provide a configuration grouping which will give proper and effective light ray diffusion and still retain a mechanically and aesthetically practical radii for the contoured configuration surface, this invention proposes the portion 8, which is depressed relative to the configurations and arcuate relative to the globe contour, said portion 8 dividing the configuration grouping into symmetrically adjacent contoured configurations $a^5$, $b^5$, $c^5$, and $d^5$. It is understood that similarly effective results may be obtained with depressions or grooves (not shown) that are molded in a position 90° relative to that of portion 8, diagonally across the grouping or individually across each configuration, or with two or more grooves in crossed fashion (not shown). Each of the individual configured areas $a^5$, $b^5$, $c^5$, and $d^5$ are preferably ovate as shown, but it is understood that the proportions may be varied taking on a more or less circular appearance as the case may be. It was found that the ovate design served to aid in providing the desired aesthetic appearance and desired lighting diffusion.

To obtain desirable diffused light transmission, it is apparent that the entire globe surface serves to break up the transmitted light rays into diffused and relatively glare-free illumination. The globe surface 9 is defined by each of the surrounding configuration groupings and is therefore irregular and varying in shape depending on the location of the defining configuration groupings on the globe surface 1. The surface 9 is preferably contoured in a manner opposite of the general contour of the individual configurations as is shown in Figs. 3, 4, and 5, which manner may take the form of a flat surface.

Although concentrated beams of light may emanate from sources within the globe, such as reflector means (not shown) or prismatic control (not shown), the desired degree of diffused light transmission from the globe may be obtained by varying the contour and size of the configurations on the globe surface. It is preferable to mold the configurations convex to the globe surface, as is shown in Figs. 2, 3, and 4 on the outer surface of the globe 1, but it will be apparent that similar diffusing effects may be obtained by molding either in a convex or concave manner, on either the inner or outer globe surfaces.

More specifically, Fig. 3 is a sectional view taken on line 3—3 of Fig. 2, and Fig. 4 is a sectional view taken on line 4—4 of Fig. 2. These figures illustrate clearly the contour of configurations $a^5$, $b^5$, $c^5$, and $d^5$, separated by the arcuate depressions, or portions 7 and 8, and globe surface depression 9, indicating that the configurations $a^5$, $b^5$, $c^5$ and $d^5$ are preferably ovate in cross section and contoured laterally relative to the overall contour of the globe 1. In order to facilitate the drawing of an enlarged configuration with emphasized contours for illustrative purposes, the general contour of the globe is minimized in the drawings, indicating an almost flat contour to the surface designated by reference character 9.

Fig. 5 is a sectional view on the line 5—5 of Fig. 2, indicating clearly the relative contours of the configurations $b^6$, $c^6$, and $d^6$, the portion 8, and the surface 9. As heretofore mentioned, the configurations included in the areas 4 and 5 are substantially identical, varying only in proportional dimensions. Configuration $a^6$ is substantially identical to $b^6$ but in left-hand or right-hand relationship.

Figs. 6 and 7 are diagrams illustrating the different effects produced by a prismatic surface and a surface embodying the present invention. In Fig. 6, the facets 10 of the prism refract the entering light rays 11 away from the axis normal to each of the facets 10, thus directing the transmitted rays 12 into long, uneven pencil-type beams giving glare-effect to the viewing eye. In the novel grouping of the configurations illustrated in Fig. 7, the entering light rays 11 are refracted by each of the ovate contours of the configurations $a^5$, $b^5$, $c^5$, and $d^5$ and the depressed arcuate portions 7 and 8, into a multiplicity of convergent and divergent directions, thus diffusing the transmitted light beams 13 and minimizing any concentrated light ray pencils which would produce glare. The globe 1 will have the appearance of an efficiently illuminated unit surrounded by a field of comfortably diffused light. The area served by luminaires employing the novel configurations represented by characters $a^5$, $b^5$, $c^5$, and $d^5$ will have the additional benefit of permitting approaching motorists and pedestrians to enter the lighted area without "squinting," which in turn will permit better and safer view of the objects located in that area. Also, "night blindness" caused by headlights of approaching automobiles will be considerably reduced with the simultaneously diminishing of contrasts.

It will be apparent that the novel configurations, represented by reference characters $a^5$, $b^5$, $c^5$, and $d^5$, may be placed on the globe surface in almost any manner by hand chipping of the mold. However, hand chipping is rather impractical and expensive from a manufacturing standpoint, one of the advantages of this invention being to provide an inexpensive method of manufacture by means of machine cutting.

In order to fit the configurations on the globe to give proper diffusion, one manner would be to provide configurations that vary considerably in dimensional proportion throughout the globe surface. However, if the individual configurations are elongated or widened, there would be a tendency toward flattening of some of the configurations, which in turn will decrease angular spread of the diffused light path.

In order that the said novel configurations may be kept nearly identical in size throughout the entire globe surface and practical from a manufacturing standpoint, a novel geometric arrangement of the groupings is provided as shown in Fig. 1 and Fig. 2 which is an enlarged elevational view of the intersection of the geometric patterns 4, 5, 5, and 6. Reference characters 4, 5, and 6 respectively refer to a particular arrangement of the configuration groupings $a^4$, $b^4$, $c^4$, $d^4$; $a^5$, $b^5$, $c^5$, $d^5$; and $a^6$, $b^6$, $c^6$, $d^6$. The configuration groupings contained within a particular pattern are identical, and preferably arranged juxtaposed with one another, each row of configurations positioned with the individual configuration groupings dovetailed with those of adjacent rows. Such arrangement facilitates machine cutting of the mold by permitting the use of an indexing head to properly orientate the mold into the path of the cutting tool, and also provides a more uniform and aesthetically designed appearance to the globe surface. It is apparent that the individual configurations may be arranged in a position (not shown) 90° relative to that shown in Figs. 1 and 2 with effective results.

To describe the preferred geometric arrangements 4, 5, and 6 of the individual configuration groupings, a general geometric pattern comprising a composite of the three areas 4, 5, and 6 will be considered. Each of the composite arrangements as shown in Fig. 1, and including the patterns 4, 5, and 6, is positioned adjacent to one another, the series defining the globe surface. The composite arrangement includes an upper inverted triangular pattern 4 including configurations $a^4$, $b^4$, $c^4$ and $d^4$ arranged in a general grouping slightly shorter and of the same width as the grouping containing representative configurations $a^5$, $b^5$, $c^5$, and $d^5$. Directly below the triangular pattern 4 is a lower diamond-shaped pattern 6 containing groupings of configurations $a^6$, $b^6$, $c^6$ and $d^6$ which are generally slightly longer and thinner than representative groupings containing configurations $a^5$, $b^5$, $c^5$ and $d^5$. The apex configuration grouping of the inverted triangular pattern 4 rests directly above the upper apex configuration grouping of the lower diamond-shaped pattern 6, while the lower apex configuration grouping of the lower diamond-shaped pattern 6 is juxtaposed with the corresponding apices of adjoining lower diamond-shaped patterns 6, which combination serves to define the crown 14 of the globe 1. Adjacent to the sides of both patterns 4 and 6, is the intermediate diamond-shaped pattern 5, comprising the representative grouping containing configurations $a^5$, $b^5$, $c^5$, and $d^5$, and extending from the crown 14 of the general globe contour to the guide rib 3. A continuation of the series of adjacent composite pattern arrangements, comprising patterns 4, 5, and 6, circumferentially define the general globe surface.

It will be apparent that the composite arrangement of patterns 4, 5 and 6 may be extended indefinitely by varying the globe proportions to include additional rows of diamond-shaped patterns made by placing an upright triangular pattern (not shown) above the present inverted triangular pattern 4 and placing another inverted triangular-shaped pattern substantially identical to pattern 4 (not shown) intermediate. The arrangement may be continued indefinitely, but the top row of patterns would necessarily have the appearance substantially as shown in Fig. 1, viz., alternate triangular-shaped patterns substantially identical to pattern 4, and intermediate diamond-shaped patterns substantially identical to pattern 6.

Although a difference in relative dimensional proportions of configurations comprising a particular grouping is indicated, it is to be noted that this slight variance, plus the novel pattern arrangement 4, 5 and 6 of the groupings, permits configurations of nearly identical size when compared to the overall globe surface. The configuration groupings are preferably positioned laterally relative to the contour of the globe 1, thus providing parallel groupings within individual patterns 4, 5 or 6 each position directed toward the general globe apex. Thus, groupings included within adjacent patterns, such as 4 and 5, and 5 and 6, will be slightly out of parallel when the said patterns are compared, as specifically indicated in the intersection of areas 4, 5, 5, and 6 illustrated in Figs. 1 and 2.

It will be apparent that a novel geometric arrangement of novel light ray diffusing configurations, substantially ovate in contour, has been provided for lighting unit globes, which globes are relatively easy to manufacture, and which may be substituted for present globes of standard luminaires now in use,

I claim:

1. A transparent light transmitting envelope having at least a portion of its light transmitting surface defined by geometric patterns arranged in interfitting relation, said patterns being determined by juxtaposed substantially ovate diffusing areas, plane diffusing areas between said ovate diffusing areas, said ovate areas each defining two elongated lenticular-like configurations spaced from each other by a narrow groove in a line bisecting the adjacent plane diffusing areas.

2. A transparent light transmitting envelope having at least a portion of its light transmitting surface defined by geometric patterns arranged in interfitting relation, said patterns being determined by juxtaposed substantially ovate diffusing areas plane diffusing areas between said ovate diffusing areas, said ovate areas each defining two elongated lenticular-like configurations spaced from each other by a narrow groove in a line bisecting the adjacent plane diffusing areas, and additional diffusing areas at opposite sides of the aforesaid ovate diffusing areas and in contact therewith.

References Cited in the file of this patent

UNITED STATES PATENTS

| D. 62,574 | Kopp | June 26, 1923 |
| D. 91,100 | Cole | Nov. 28, 1933 |
| 1,299,936 | Harrison | Apr 8, 1919 |
| 1,761,654 | Cole | June 3, 1930 |
| 2,099,034 | Rolph | Nov. 16, 1937 |

FOREIGN PATENTS

| 61,069 | Austria | Sept. 10, 1913 |